United States Patent
Duanmu et al.

(10) Patent No.: US 7,657,192 B2
(45) Date of Patent: *Feb. 2, 2010

(54) BURST MODE OPTICAL RECEIVER AND SYSTEM AND METHOD THEREFOR

(75) Inventors: Jia-Jay Duanmu, Hsinchu (TW); Yun-Lung Chou, Hsinchu (TW); Shi-Wei Lee, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/155,808

(22) Filed: Jun. 10, 2008

(65) Prior Publication Data

US 2009/0028581 A1    Jan. 29, 2009

Related U.S. Application Data

(63) Continuation of application No. 10/867,838, filed on Jun. 16, 2004, now Pat. No. 7,394,996.

(51) Int. Cl.
*H04B 10/06* (2006.01)

(52) U.S. Cl. .................. 398/202; 398/208; 398/209; 398/210

(58) Field of Classification Search ................ 398/41, 398/66–75, 202–214
See application file for complete search history.

(56) References Cited

U.S. PATENT DOCUMENTS

| 5,025,456 | A | 6/1991 | Ota et al. |
|---|---|---|---|
| 5,371,763 | A | 12/1994 | Ota et al. |
| 5,381,052 | A | 1/1995 | Kolte |
| 5,430,766 | A | 7/1995 | Ota et al. |
| 5,875,050 | A | 2/1999 | Ota |
| 6,115,163 | A | 9/2000 | Nobuhara |
| 6,362,911 | B1 | 3/2002 | Lee et al. |
| 6,907,202 | B1 | 6/2005 | Ide et al. |
| 7,394,996 | B2 * | 7/2008 | Duanmu et al. ............. 398/202 |
| 2003/0020334 | A1 | 1/2003 | Nozu |
| 2003/0194244 | A1 | 10/2003 | Doh et al. |
| 2003/0202802 | A1 | 10/2003 | Doh et al. |
| 2004/0075484 | A1 | 4/2004 | Nishizono et al. |
| 2004/0190913 | A1 | 9/2004 | Seo et al. |
| 2004/0208537 | A1 | 10/2004 | Lee et al. |

FOREIGN PATENT DOCUMENTS

EP    1355464    10/2003

* cited by examiner

*Primary Examiner*—Ken N Vanderpuye
*Assistant Examiner*—Li Liu
(74) *Attorney, Agent, or Firm*—Finnegan, Henderson, Farabow, Garrett & Dunner, LLP

(57) ABSTRACT

A communications system includes an optical receiver for receiving optical signals and for converting the optical signals into electrical signals, a transimpedance amplifier ("TIA") for filtering the electrical signals, a limiting amplifier coupled with the TIA, an automatic threshold control ("ATC") coupled with the TIA for providing a reference voltage for the limiting amplifier. The ATC further includes a common emitter circuit and an emitter follower circuit, wherein logic high signals and logical low signals in the electrical signals are determined based on the reference voltage output from the ATC.

1 Claim, 3 Drawing Sheets

BURST MODE OPTICAL RECEIVER AND SYSTEM AND METHOD THEREFOR

This is a Continuation of U.S. patent application Ser. No. 10/867,838, filed Jun. 16, 2004 now U.S Pat. No. 7,394,996, which is incorporated herein by reference in its entirety.

BACKGROUND OF THE INVENTION

1. Field of the Invention

The present invention generally relates to a communications system and, more particularly, to a burst mode optical receiver and system and method therefor.

2. Description of the Related Art

Optical communications systems utilize receivers capable of receiving data continuously transmitted (i.e., in continuous mode) or data transmitted in a burst mode (i.e., a direct unencoded transmission of data wherein the data being transmitted have long strings of only 1s or long strings of only 0s). FIGS. 1A, 1B, 1C and 1D are diagrams illustrating waveforms of data transmission in continuous mode and in burst mode, each with and without direct current ("DC") offset. In particular, FIGS. 1A and 1B diagrams that illustrate waveforms of data transmission in a continuous mode with and without DC offset, respectively. FIGS. 1C and 1D are diagrams that illustrate waveforms of data transmission in a burst mode with and without DC offset, respectively. Alternating current ("AC") coupled optical receivers capable of performing continuous data transmission are also employed in conventional communications systems.

DC coupled optical receivers capable of performing burst mode transmission are also employed in conventional communications systems. Data encoding and decoding required in burst mode transmission, however, undesirably increases system complexity and reduces transmission speed. Examples of conventional communications systems utilizing burst mode transmission are illustrated in, e.g., U.S. Pat. Nos. 5,025,456, 5,371,763 and 5,875,050. When digital data signals are received from a data channel, those signals are often degraded to analog signals having uncertain amplitude and non-discernible transitions between logic 1s and 0s. As the logic transitions become difficult to identify, the effects of noise and pulse width distortion adversely affect the system sensitivity and bandwidth.

There is thus a general need in the art for a system and method overcoming at least the aforementioned shortcomings in the art. A particular need exists in the art for a burst mode optical receiver and system and method overcoming disadvantages with respect to signal degradation in deciphering logic transitions, noise and distortion effects in communications networks employing burst mode transmission.

BRIEF SUMMARY OF THE INVENTION

Accordingly, an embodiment of the present invention is directed to a burst mode optical receiver and system and method that obviate one or more of the problems due to limitations and disadvantages of the related art.

To achieve these and other advantages, and in accordance with the purpose of the present invention as embodied and broadly described, there is provided a system comprising an optical receiver for receiving optical signals and for converting the optical signals into electrical signals, a transimpedance amplifier ("TIA") for filtering the electrical signals, a limiting amplifier ("LA") having a first input coupled to the transimpedance amplifier, and an automatic threshold control ("ATC") coupled with the transimpedance amplifier, the automatic threshold control providing a reference voltage to a second input of the limiting amplifier. In one aspect, the automatic threshold control comprises a common emitter portion and an emitter follower portion. In another aspect, logic high signals and logic low signals in the electrical signals are determined relative to the reference voltage.

Also in accordance with the present invention, there is provided a data transmission method comprising receiving optical signals, converting the optical signals into electrical signals, filtering the electrical signals, controlling a threshold voltage between highs and lows of the electrical signals with a common emitter circuit and a emitter follower circuit, and determining logic high signals and logic low signals in the electrical signals relative to the threshold voltage.

In accordance with a further embodiment of the present invention, there is provided a communications system having a passive optical network ("PON") a burst mode optical receiver for receiving optical signals in bursts and for converting the optical signals into electrical signals, a transimpedance amplifier ("TIA") for filtering the electrical signals, a limiting amplifier coupled with the TIA, an automatic threshold control ("ATC") coupled with the TIA for providing a reference voltage for the limiting amplifier. In one aspect, the automatic threshold control further comprises a common emitter portion and an emitter follower portion. In another aspect, logic high signals and logic low signals in the electrical signals are determined relative to the reference voltage.

Additional features and advantages of the present invention will be set forth in part in the detailed description which follows, and in part will be obvious from the description, or may be learned by practices consistent with the present invention. The features and advantages of the present invention will be realized and attained by means of the elements and combinations particularly pointed out in the appended claims.

It is to be understood that both the foregoing general description and the following detailed description are exemplary and explanatory only and are not restrictive of the present invention, as claimed.

The accompanying drawings, which are incorporated in and constitute a part of this specification, illustrate several embodiments of the present invention and together with the description, serve to explain the principles of the present invention.

DESCRIPTION OF THE EMBODIMENTS

Reference will now be made in detail to present embodiments of the present invention, examples of which are illustrated in the accompanying drawings. Wherever possible, the same reference numbers will be used throughout the drawings to refer to the same or like parts.

Figure 1:
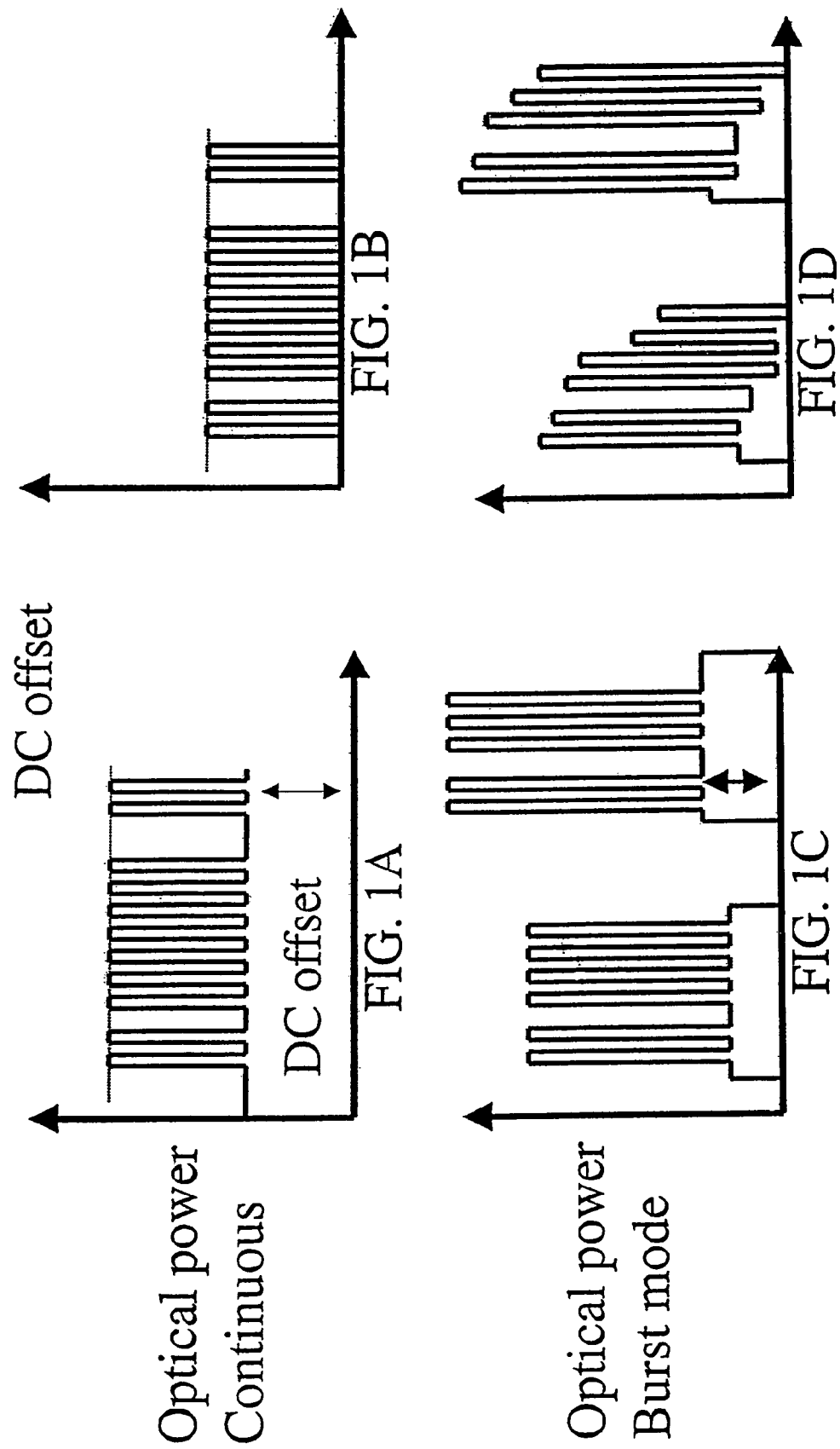
FIGS. 1A, 1B, 1C and 1D are diagrams illustrating waveforms of data transmission in continuous mode and in burst mode.
Figure 2:
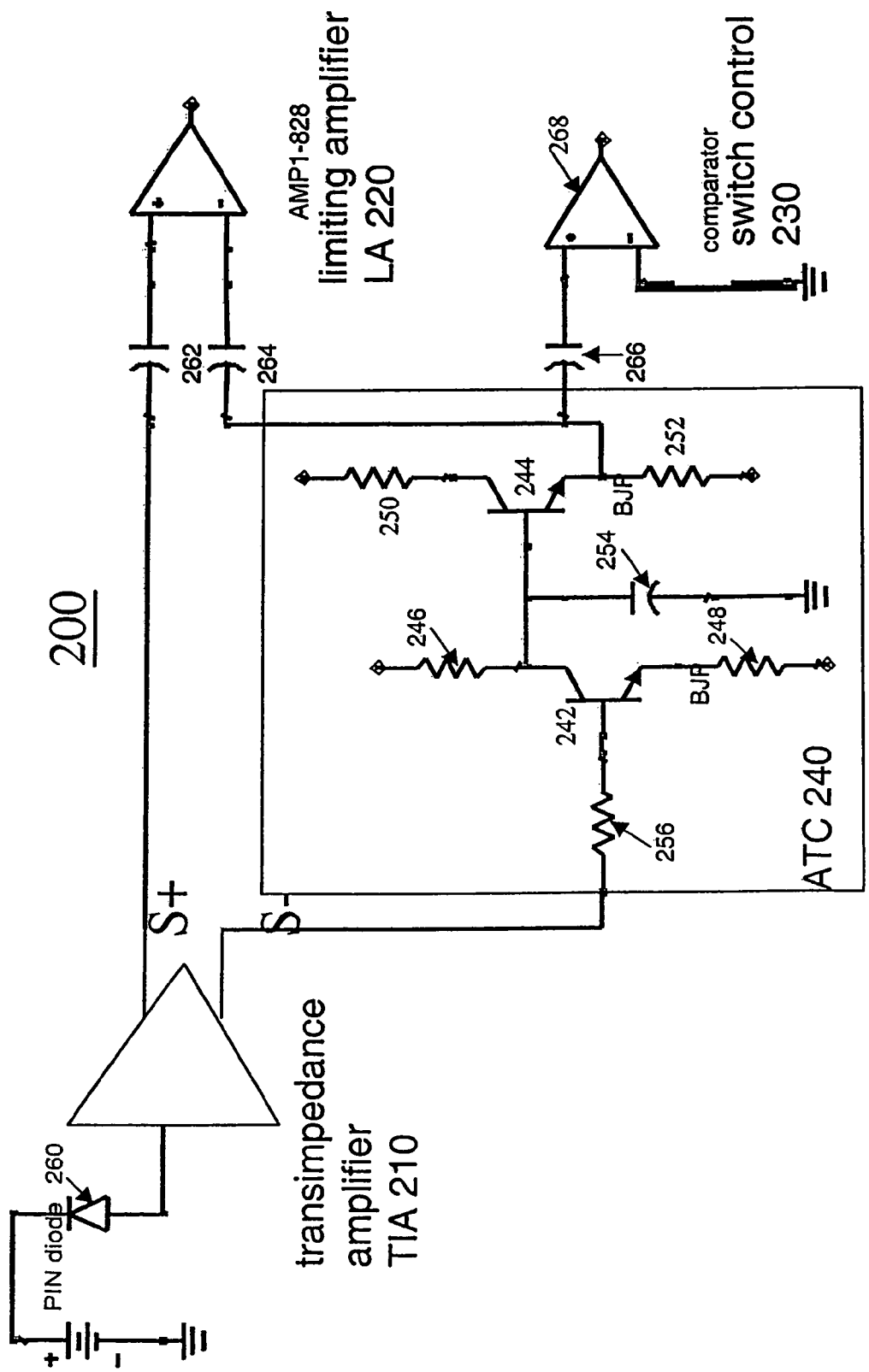
FIG. 2 is a schematic view of an example of a burst mode optical receiver in a system according to an embodiment of the present invention.
Figure 3:
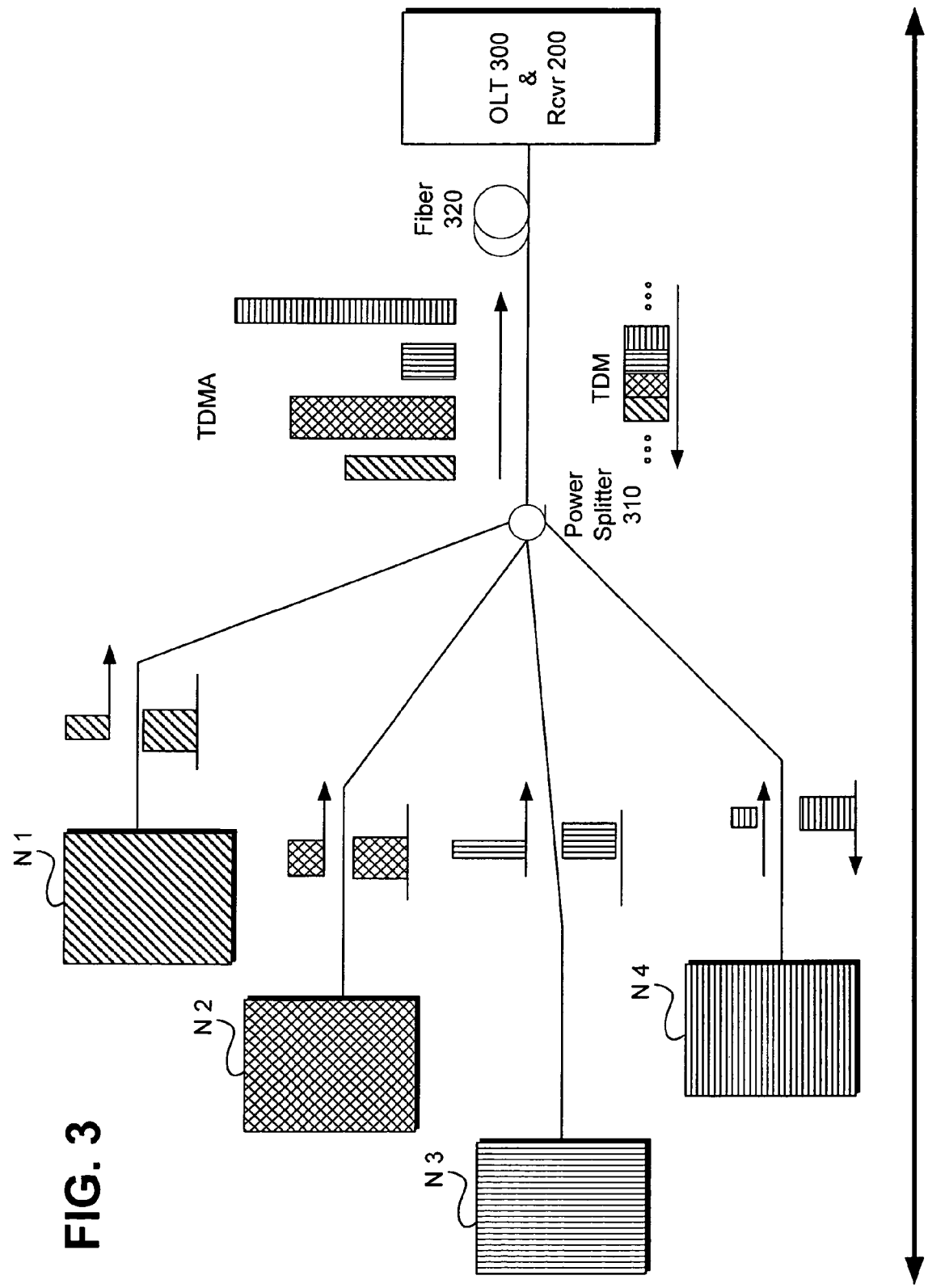
FIG. 3 is a schematic view that illustrates an example of a transmission system in which a burst mode optical receiver consistent with the present invention is utilized.

FIG. 2 is a schematic view of an example of a burst mode optical receiver in a system according to an embodiment of the present invention. FIG. 3 is a schematic view that illustrates an example of a transmission system having, e.g., a passive optical network ("PON"), to which embodiments consistent with the present invention may be applied. Burst mode optical receiver 200 (shown in FIG. 3 in conjunction with office line terminal or "OLT 300") comprises a transimpedance amplifier ("TIA 210"), a limiting amplifier ("LA 220"), a switch control 230, and an automatic threshold control ("ATC 240"). ATC 240 further comprises transistors 242 and 244 configured as a common emitter circuit coupled with an emitter follower circuit. Resistors 246 and 248 are coupled to the collector and emitter, respectively of transistor 242 and resisters 250 and 252 are coupled to the collector and emitter, respectively of transistor 244. Resistors 246 and 250 are connected to a supply voltage. Resistors 248 and 252 are connected to the ground. In one aspect, optical receiver 200 is implemented in a system with wavelength division multiplexing ("WDM").

Referring also to FIG. 3, OLT 300 is coupled with a plurality of optical network units or ONUs (N1, N2, N3, N4, ...) through a power splitter 310 such as a star coupler. An optical fiber line 320 carries data being transmitted in time division multiple access ("TDMA") between power splitter 310 and OLT 300. Downstream optical transmission from OLT 300 to the ONUs and upstream transmission from the ONUs to OLT 300 are carried out. Upstream transmission is carried out by transmitting signals from optical transmitters and wavelength division multiplexers in the ONUs. The signals pass through the individual optical fiber transmission lines coupled to the ONUs, power splitter 310, and optical fiber line 320 common to the ONUs and OLT 300. The signals from the ONUs are transmitted in bursts over this common fiber line 320, which are received at OLT 300 at optical receiver 200 through another wavelength division multiplexer (not shown in FIG. 3). Optical receiver 200 receives the burst-like optical signals from the ONUs and converts them into electrical signals.

As shown in FIG. 2 specifically, the common emitter circuit in ATC 240 comprises transistor 242 having a base, collector and emitter, resistors 246 and 248, a capacitor 254 in parallel with resistor 248. The base of transistor 242 in the common emitter circuit is coupled with the negative output S− of TIA 210 through a resistor 256. The emitter follower circuit in ATC 240 comprises transistor 244 having a base, collector and emitter, and resistors 250 and 252. The base of transistor 244 is coupled to the collector of transistor 242 and to capacitor 254. A DC voltage source is connected to a pin diode 260, and coupled with an optical component that converts optical signals into electrical signals, such as a pin photo diode 260 whose output is connected in series to TIA 210. Outputs S+ of TIA 210 is connected to limiting amplifier LA 220 having an operational amplifier comparator through capacitor 262. Output S− of TIA 210 is connected to ATC 240 through resistor 256. The output from ATC 240 is connected to LA 220 through a capacitor 264, and to switch control 230 through a capacitor 266. Switch control 230 quickly accumulates the voltage input at capacitor 266. Switch control 230 further comprises an operational amplifier 268. When there is a signal input, switch control 230 will turn on LA 220. When there's no signal input, switch control 230 will turn off LA 220 in order to prevent adverse effects to LA 220 due to voltage oscillation and signal distortion. In another aspect, switch control 230, when coupled with a clock and data recovery ("CDR") circuit such as a phase locked loop ("PLL") or a delay lock loop ("DLL"), can advantageously be provided for controlling system clock signal and data recovery in optical receiver 200.

As burst mode optical receiver 200 receives optical signals from the ONUs through fiber line 320, pin diode 260 is an optical component that converts the optical signals into electrical signals, which are in turn transformed into low noise output signals at transimpedance amplifier TIA 210. Output signals S+ and S− from TIA 210 are respectively supplied to limiting amplifier LA 220 and ATC 240. As burst mode optical signals are received, through output S− from TIA 210, optical receiver 200 drives the common emitter circuit and charges up capacitor 254 therein. Capacitor 254 is charged up to a voltage level that is generally the same as that of the output S− from TIA 210. The emitter follower circuit prevents capacitor 254 from overcharging. The emitter follower circuit thereby advantageously mitigates adverse effects on charging due to continuous high-frequency signal inputs into optical receiver 200.

Thus, ATC 240 is connected to the negative output S− from TIA 210. ATC 240 serves to establish a desired logic threshold in determining whether the electrically-converted optical signals represent 1s or 0s. ATC 240 outputs a threshold value to a second input of LA 220 through capacitor 264. LA 220 is selected to have a sensitivity that can optimally amplify signals having a magnitude of 5 mV or higher. The threshold value serves as a reference voltage applied to the negative input of LA 220 for logically discerning 1s and 0s in the output signals from TIA 210 through capacitor 262. The function of ATC 240 ensures that the threshold maintains a value that is approximately midway between high and low magnitudes of the signal being input into TIA 210 in advantageously preventing pulse-width distortion in the logic output.

Embodiments consistent with the present invention can include a data transmission method comprising receiving optical signals, converting the optical signals into electrical signals, filtering the electrical signals, controlling a threshold voltage between highs and lows of the electrical signals with a common emitter circuit and an emitter follower circuit, and determining logic high signals and logical low signals in the electrical signals based on the threshold voltage. In one aspect, the method is implemented in a system having a passive optical network ("PON") where the optical signals are transmitted in bursts. The optical signals can further be wavelength division multiplexed as they are transmitted to the optical receiver. As a capacitor in the common emitter circuit is charged, switch control is provided for advantageously preventing overcharging therein.

Other embodiments of the present invention will be apparent to those skilled in the art from consideration of the specification and practice of the present invention disclosed herein. It is intended that the specification and examples be considered as exemplary only, with a true scope and spirit of the present invention being indicated by the following claims.

We claim:

1. An automatic threshold control circuit for coupling between a transimpedance amplifier and a limiting amplifier of a burst mode optical receiver for converting received optical signals into electrical signals, the circuit comprising:
    a common emitter portion including an input for receiving the electrical signals;
    an emitter follower portion coupled to the common emitter;
    a switch control coupled to an output of the emitter follower portion and to an input of the limiting amplifier, the switch control being adapted to turn the limiting amplifier on and off in response to whether or not the electrical signals are being received; and
    wherein the common emitter portion includes a capacitor coupled to the emitter follower portion, the capacitor thereby coupled to be charged by the electrical signals.

* * * * *